Oct. 8, 1968
D. H. REDMAN
3,404,459
CIRCULAR FUNCTION GENERATOR
Filed Nov. 28, 1966
2 Sheets-Sheet 2
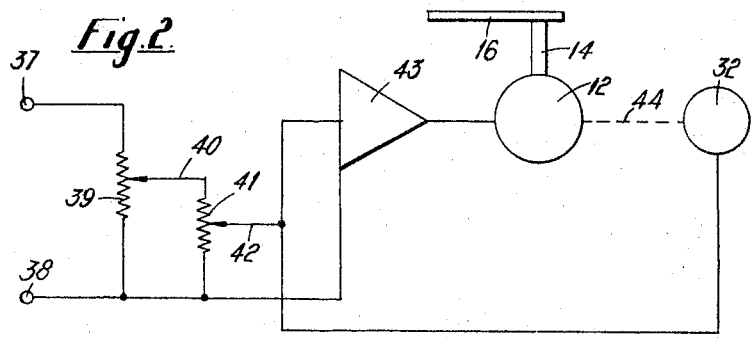
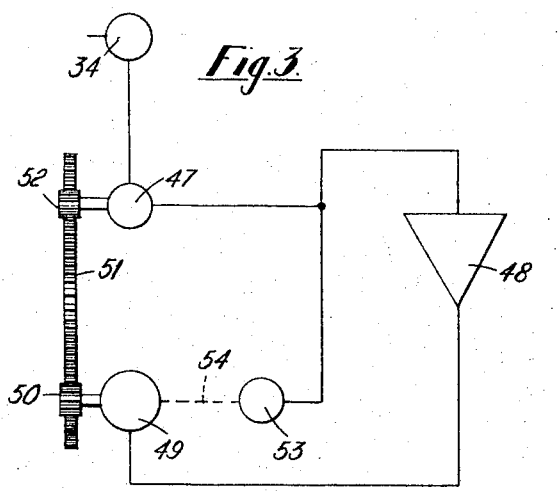
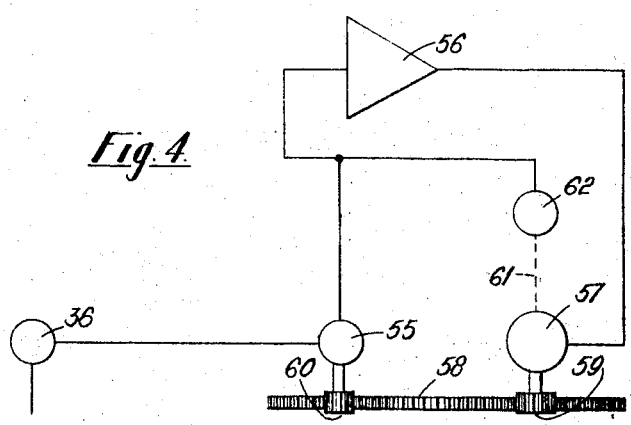
Inventor
DEREK H. REDMAN
By *Imrie & Smiley*
Attorneys 3,404,459
CIRCULAR FUNCTION GENERATOR
Derek Harry Redman, Croydon, England, assignor to Hancock & Co. (Engineers) Limited, Croydon, England, a British company
Filed Nov. 28, 1966, Ser. No. 597,410
Claims priority, application Great Britain, Dec. 8, 1965, 52,048/65
1 Claim. (Cl. 33—23)

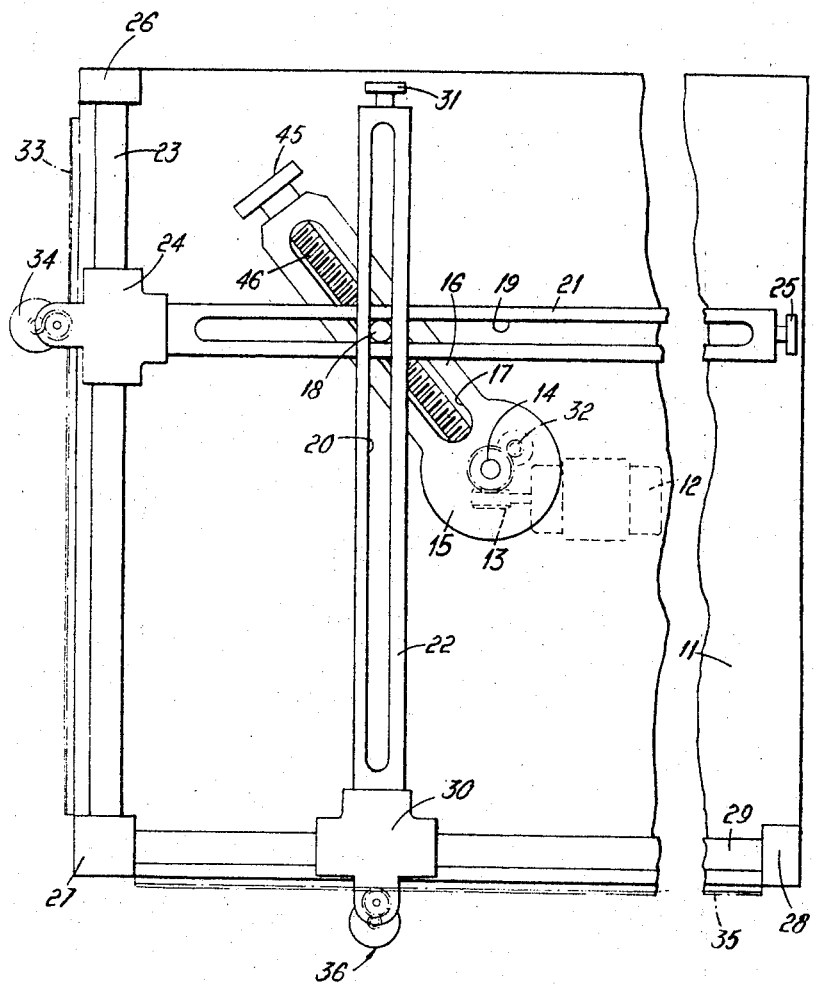

ABSTRACT OF THE DISCLOSURE

Apparatus for guiding a tool in a circular path in a machine, in which a sine/cosine slide mechanism controls data transmission means by which the tool is guided, the slide mechanism is operated by a crank pin mounted on a further slide within a rotating radius arm, and a potentiometer has its resistance element distributed along the radius arm and its slider movable with the further slide, whereby the speed of a motor driving the radius arm is so varied that the crank pin moves at the same speed for all positions of the further slide.

---

This invention relates generally to oxygen jet cutting machines and more particularly to a circular function generator for use with such machines by which circles may be cut automatically without using a line following device.

It is known to provide an automatic line following device in an oxygen jet cutting machine, in which an outline of the shape to be cut from a workpiece (a piece of steel plate) is formed on a substrate, for example, an ink outline on a sheet of drawing paper, and a photoelectric line following device is arranged automatically to follow this outline. The movement of the line following device is transmitted by mechanical or electrical means to a carriage which carries an oxygen jet cutting burner, so that the cutting burner cuts a shape from the workpiece which corresponds to the outline. The transmission means between the line following device and the carriage carrying the cutting burner may be mechanical or electrical, and if desired it may be arranged that the movement of the cutting torch in all directions is multiplied, as compared with the movement of the follower, so that, for example, the shape cut from the workpiece is ten times as large in all directions as the outline.

The object of the invention is to provide means by which circles of any size within the capacity of the machine may be cut without the necessity of providing an outline or a line following device. It will be understood that, while the invention is described in its application to oxygen jet cutting machines, it may be applied to other types of machine in which a tool is to be guided in a circular path.

The invention consists of an apparatus for use with a machine such as an oxygen jet cutting machine guiding a tool in a circular path comprising a rotatable radius arm carrying a crank pin, a sine/cosine slide mechanism having two slotted arms set at right angles to each other and adapted to slide in directions at right angles to the respective slots, the two slots being engaged by the crank pin, data transmission means associated with each arm to transmit data relating to the instantaneous position of the arm, data receiving means associated with each data transmission means, and a servo motor and feedback means associated with each receiving means to move the tool in mutually perpendicular directions in accordance with the positions of the respective arms.

The crank pin is conveniently mounted on a slide incorporated in the radius arm, with adjusting means for moving the crank pin to different radial positions on the arm in order to vary the diameter of the circle on which the tool moves, and a potentiometer may be associated with the adjusting means to ensure that the speed of movement of the tool is the same irrespective of the size of the circle being traversed.

In order that the invention and its method of use may clearly be understood one embodiment thereof will now be described with reference to the accompanying drawing in which—

FIGURE 1 is a diagrammatic plan view of the mechanical portion of the apparatus;

FIGURE 2 is a circuit diagram showing how the movement of the radius arm is controlled;

FIGURE 3 shows the circuitry associated with one data transmission channel for controlling the movement of the tool in one direction; and FIGURE 4 shows the circuitry associated with the other data transmission channel for controlling the movement of the tool in a direction perpendicular to the said one direction.

Referring initially to FIGURE 1, the apparatus comprises a base 11, which may conveniently be horizontal. A geared servo motor 12 is provided with speed reducing gearing, generally indicated at 13, which drives a vertical shaft 14 on which the hub 15 of a rotatable radius arm 16 is mounted. The radius arm 16 is provided with a slot 17 in which a slide is mounted carrying a crank pin 18. The crank pin 18 engages slots, respectively 19 and 20, in two slide arms, respectively 21 and 22.

The slide arm 21 is mounted on a sliding head 24 carried on a slide 23, which may conveniently be a cylindrical bar fixed to supports 26 and 27. A small guide wheel 25 is provided at the other end of the slide arm 21 to support the arm at a desired distance above the base 11. Mounted between the support 27 and a further support 28 is a second slide 29, also in the form of a cylindrical slide bar, and this carries a further sliding head 30 which supports one end of a slide arm 22, the other end of the slide arm 22 being supported above the base 11 by a further small wheel 31. The slides 23 and 29 are set at right angles to each other and for convenience in description the movement of the sliding head 30 along the bar 29 will be referred to hereinafter as the X movement, while the movement of the sliding head 24 along the slide 23 will be hereinafter referred to as the Y movement.

A tacho-generator 32 is mounted to be driven by the reduction gearing associated with the servo motor 12. A rack 33, parallel to the slide 23, engages gearing carried on the sliding head 24 and this gearing is arranged to drive a first synchro transmitter 34, while a similar rack 35, parallel to the slide 29, is arranged to engage gearing mounted on the sliding head 30 which drives a second synchro transmitter 36.

In operation the motor 12 runs at a certain speed which is controlled in a manner to be described hereinafter. The motor rotates the radius arm 16, and the crank pin 18 on the radius arm causes the slide arms 21 and 22 to move along their respective slides in such a manner that at any instant the position of the arm 21 represents the sine of the angle which the radius arm makes with a given datum line while the position of the arm 22 represents the cosine of the angle.

FIGURE 2 shows how the speed of the motor 12 is controlled. A source of substantially constant alternating voltage is applied to terminals 37 and 38 and a potentiometer 39 is connected across these terminals. The slider 40 of potentiometer 39 is connected to one end of a further potentiometer 41, the other end of which is connected to terminal 38. The slider 42 of potentiometer 41 is connected to one input terminal of an amplifier 43, the other input terminal of which is connected to terminal 38. The output of the amplifier 43 is connected to the motor 12 which drives the spindle 14 carrying the rotatable arm 16. The motor 12 is coupled to the tacho-generator 32 by a mechanical link 44, as already described, and the electrical output of the tacho-generator 32 is connected back to the slider 42 of potentiometer 41 in such a sense as to oppose the input to the amplifier 43 from the potentiometer 41, to provide a velocity feedback voltage in accordance with normal servo practice.

The slider 40 of potentiometer 39 may conveniently be calibrated in terms of cutting speed, for example, inches or centimetres per minute. Conveniently the potentiometer 41 may consist of a rod or strip of insulating material carrying the potentiometer winding and mounted on the arm 16, the slider 42 of this potentiometer being coupled to the slide which carries the crank pin 18 so that the setting of the potentiometer 41 is varied with the position of the crank pin 18 along the length of the radius arm 16. A knob 45 connected with a screw 46, by which the position of the crank pin 18 may be adjusted along the length of the radius arm is conveniently calibrated in terms of speed of movement of the cutting burner in inches or centimetres per second.

In operation the speed at which the cutting burner is to move with respect to the workpiece is set up by adjustment of the slider 40 of the potentiometer 39. The diameter of the circle which is to be cut is then set up by means of the knob 45. It will be appreciated that for a given rotational speed of the radius arm 16 the circumferential speed of the crank pin 18 will depend upon its position along the length of the radius arm 16. In order, therefore, to keep the actual cutting speed to the value set up on the potentiometer 39 it is arranged that the slider 42 of the potentiometer 41 automatically reduces the rotational speed of the motor 12 as the radius at which the crank pin 18 is set increases so that the cutter is caused to travel at the speed set up on the potentiometer 39 whatever the diameter of the circle being cut.

As the slide arm 21 reciprocates on the slide 23 the synchro transmitter 34 is rotated. As shown in FIGURE 3 the transmitter 34 is coupled to a synchro receiver 47 whose output is electrically connected to the input of an amplifier 48. Thus, any movement of the arm 21 from a given position causes the transmitter 34 to transmit a signal to the receiver 47 which produces an output proportional to the movement. This output is amplified by the amplifier 48 and the amplifier output is fed to a servo motor 49 which, by means of a pinion 50, drives a rack 51 which is coupled to a carriage (not shown) on which the cutting burner is mounted. Movement of the rack 51 drives a pinion 52 connected to the synchro receiver 47, the connections being such that this movement tends to reduce the electrical output signal from the receiver 47 to zero. A further tacho-generator 53 is mechanically coupled to the motor 49 by a mechanical link 54, the output of the tacho-generator 53 opposing the signal applied to the amplifier 48 by the synchro receiver 47 in accordance with normal servo practice.

The reciprocating movement of the slide arm 22 with respect to the slide 21 causes rotation of the rotor of the synchro 36 and the electrical output signal from this transmitter is transmitted to a synchro receiver 55 (FIGURE 4) which energizes an amplifier 56 whose output feeds a servo motor 57 driving a rack 58 through a pinion 59, the rack 58 being arranged to move the carriage (not shown) carrying the cutting burner in a direction at right angles to the movement caused by the rack 51. Movement of the rack 58 rotates the synchro receiver 55 through the medium of a pinion 60 to reduce the output of the receiver 55 to zero. The motor 57 is also coupled through a mechanical link 61 to a further tacho-generator 62 whose output opposes the signal from the synchro receiver 55 at the amplifier 56. The circuitry of FIGURE 4 is the same as that of FIGURE 3 and no further description of it is deemed necessary.

From the foregoing description it will be evident that the apparatus operates by dividing the movement of the crank pin 18 into the X and Y components, separately transmitting data relating to the components, and causing movements of the tool corresponding to the separate components, so that the resulting movement of the tool duplicates the movement of the crank pin.

As illustrated, the two pinions on the synchro transmitters are of the same size so that the movement of the rack 51, for example, is equal to the movement of the slide arm 21. If, however, the gear ratios were altered so that the synchro transmitter 34 is caused to rotate 10 times as fast for a given movement of the slide arm 21 then the rack 51 would be moved 10 times as far. If this ratio were applied to both the synchro transmitters then the movement of the tool would in all directions be 10 times as great as the movements of the arms 21 and 22 so that if a workpiece were being cut on an oxygen jet cutting machine the circle cut would be 10 times as large as the circle traced out by the crank pin 18. Other ratios may be obtained in the same way.

An oxygen jet cutting burner guided by the apparatus of the invention would usually be set normal to the plane of the workpiece. If, however, the burner is mounted on a head which is rotatable on an axis normal to the plane of the workpiece, the burner is set at an angle to the workpiece, and the head is appropriately rotated in synchronism with the rotation of the radius arm, then a circular workpiece with a bevelled edge may be cut. The rotation of the head may be obtained by means of a synchro resolver driven by the shaft 18 at the same speed as the radius arm.

It will be understood that various modifications in the apparatus described may be made within the scope of the invention. For example, the physical shape of the potentiometer 41 which is actuated by movement of the crank pin 18 need not be as described, and if desired this potentiometer need not be carried on the radius arm 16. Instead it could be separately adjusted to a setting corresponding to the radius at which the crank pin 18 is positioned. The screw 46 may be motor driven and remotely controlled, the radius to which the slide carrying the crank pin 18 is set being indicated by remote electrical indicating means.

I claim:

1. Apparatus for use with a machine such as an oxygen jet cutting machine for guiding a tool in a circular path comprising a rotatable radius arm, a sine/cosine slide mechanism having two slotted arms set at right angles to each other and adapted to slide in directions at right angles to the respective slots, a further slide in the radius arm, a crank pin mounted on the further slide, a screw for setting the further slide in any desired position in the radius arm, the two slots in the slotted arms being engaged by the crank pin, data transmission means associated with each slotted arm to transmit data relating to the instantaneous position of the arm, data receiving means associated with each data transmission means, a servo motor associated with each data receiving means respectively to move the tool in mutually perpendicular directions in accordance with the positions of the respective slotted arms, a potentiometer having its resistance element distributed along the length of the radius arm, the potentiometer slider being movable with the further slide, and a motor to rotate the radius arm, the potentiometer being connected in the motor control circuit to vary the speed of the motor in such a manner that the crank pin moves at substantially the same speed irrespective of the position of the further slide in the radius arm.

References Cited

UNITED STATES PATENTS

| | | | |
|---|---|---|---|
| 2,202,131 | 5/1940 | Wagner | 266—23 |
| 2,588,763 | 3/1952 | Reilly et al. | 33—18 |
| 2,907,623 | 10/1959 | Parenti | 33—1 X |
| 2,963,794 | 12/1960 | Peck | 33—1 |
| 3,032,881 | 5/1962 | Fengler | 33—23 |
| 3,037,760 | 6/1962 | Arnault | 33—23 |
| 3,119,184 | 1/1964 | Projansky | 33—25 |
| 3,182,399 | 5/1965 | Price | 33—1 X |

FOREIGN PATENTS 388,655   1/1924   Germany.

OTHER REFERENCES

Publication: Product Engineering, September 1949, pp. 119–123, "Mechanical Computing Mechanisms."

HARRY N. HAROIAN, *Primary Examiner.*